United States Patent
Kvamme (12)

(10) Patent No.: US 6,223,229 B1
(45) Date of Patent: Apr. 24, 2001

(54) METHOD FOR DETECTING A CABLE TYPE BY UTILIZING THE PERIPHERAL DEVICE TO MEASURE AND SEND A STATE OF THE PDIAG-SIGNAL TO THE HOST

(75) Inventor: Eric Kvamme, Scotts Valley, CA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/154,183

(22) Filed: Sep. 16, 1998

(51) Int. Cl.[7] ............................. G06F 3/00; G06F 13/00
(52) U.S. Cl. ..................... 710/10; 710/8; 710/9; 710/35
(58) Field of Search ............................. 710/8, 9, 10, 35

(56) References Cited

U.S. PATENT DOCUMENTS 5,758,188   5/1998   Applebaum et al. ............. 710/35

OTHER PUBLICATIONS

Information Technology AT Attachment with Packet Interface Extension (ATA/ATAPI-4), Aug. 1998, McLean.*

* cited by examiner

Primary Examiner—Thomas Lee
Assistant Examiner—Tammara Peyton
(74) Attorney, Agent, or Firm—Henry Groth; John C. Chen

(57) ABSTRACT

A cable detection method is provided for detecting the existence of an 80-conductor cable used in connecting a host device to peripheral devices of a computer system. An 80-conductor cable is required for Ultra-ATA to function at data transfer rates of modes 3 or 4. In compliance with ATA/ATAPI standards and requirement, the cable detection method includes the placement of a capacitor on the PDIAG- signal at the host. A device would assert the PDIAG- signal to a low state for a predetermined length of time to discharge the capacitor, release the signal then measure the state of the signal within a window of time, thereby assuring a high state for an 80 conductor cable and a low state for a non-80 conductor cable.

16 Claims, 3 Drawing Sheets

METHOD FOR DETECTING A CABLE TYPE BY UTILIZING THE PERIPHERAL DEVICE TO MEASURE AND SEND A STATE OF THE PDIAG-SIGNAL TO THE HOST

BACKGROUND OF THE INVENTION

1. Field of Invention

The present invention relates generally to methods for use in disk drives for computer systems. More particularly, the present invention relates to method for detecting the existence or non-existence of an 80-conductor cable that connects a host device and a peripheral device in a computer system.

2. Description of the Relevant Art

Data transfer rates between a host device and peripheral devices within a personal computer, PC, system are limited by the bus architecture interconnecting the devices. One type of bus commonly used to interconnect or interface the peripheral drive device to a system bus of a PC is an ATA (AT Attachment) bus, which is a disk drive interface originally designed for the ISA bus of a the IBM PC/AT. As PC systems have become faster and more complex, the definition of the ATA bus has been expanded to include operating modes performing faster data transfer rates. There are several versions of ATA. For example, ATA, also known as IDE, supports one or two peripheral devices, a 16-bit interface and PIO (programmed I/O) modes 0, 1 and 2. ATA-2, also known as Fast ATA and Enhanced IDE, supports faster PIO modes 3 and 4 and multiword DMA modes (1 and 2). Ultra-ATA, also known as Ultra-DMA, ATA-33 and DMA-33, supports DMA mode 2 running at 33 MBps. Commonly assigned U.S. Pat. No. 5,758,188 entitled, "Synchronous DMA Burst Transfer Protocol Having the Peripheral Device Toggle the Strobe Signal Such That Data is Latched Using Both Edges of the Strobe Signal" describes the Ultra-ATA protocol and is incorporated herein by reference.

In order for Ultra ATA to function at rates higher than mode 2, a special 80 conductor cable is required. Both the Small Form Factor (SSF) 8049 and ATA/ATAPI-4 standards specify characteristics of this cable that were designed to allow it to be detected as different than the standard cable by the host controller. Specifically, ATA/ATAPI requires PDIAG- (Passed Diagnostics) signal to be asserted (driven low) by one device to indicate to the other device that it has completed its diagnostics routine. Additionally, CBLID- (Cable ID) is to used only for 80 conductor cable assemblies and connected to the ground pins in the host-side connector. PDIAG-/CBLID- are used interchangeably herein, as well as ATA standard, since both PDIAG- and CBLID- are the same pin on the cable connector. For a 40 conductor cable, PDIAG- and CBLID- are therefore the same signal. Since the 80 conductor cable was made to increase signal integrity for all ATA/ATAPI transfers, the ATA/ATAPI detection method was written so that the cable could be identified (in general) independent of the type of device attached to the cable.

ATA/ATAPI defines a cable detection method wherein the host may sample CBLID- after a power-on or hardware reset in order to detect the presence or absence of an 80-conductor cable assembly by performing the following steps:

a) The host waits until the power on or hardware reset sequence is complete for all devices on the cable;

b) If a device 1 is present, the host issues IDENTIFY DEVICE or IDENTIFY PACKET DEVICE and uses the returned data to determine that Device 1 is compliant with ATA-3 or subsequent standards. Any device compliant with ATA-3 or subsequent standards releases PDIAG- no later than after the first command following a power on or hardware reset sequence.

If the host detects that CBLID- is connected to ground, it is an indication that an 80-conductor cable assembly is installed in the system. If the host detects that this signal is not connected to ground, it is an indication that an 80-conductor cable assembly is not installed in the system.

As shown in FIG. 2a, with an 80 conductor cable, there is nothing that the devices can do to affect the state of CBLID- 26 at the host connector A since the cable is open to the host 25 on that signal and it is grounded inside the host connector itself. With a 40 conductor cable, shown in FIG. 2b, the state of PDIAG- 22 at the host 25 will be the same at all three connectors A', B' and C'. Since ATA/ATAPI requires the devices 23 and 24 to have pull-up resistors on PDIAG- 22, the state of that line 22 will be high when all devices have released that signal. A pull-up resistor causes a signal to Vcc to go high when that signal is not actively driven. After the power-on or reset handshaking and the first command has been sent, the devices should release that line. If the host senses a high, it is assured to be a 40-conductor cable. If the host senses a low, then it is most likely an 80-conductor cable. However, there are ATA/ATAPI devices that do not release PDIAG- when they are used as a slave device but continue to assert that signal beyond the point when they should. With one of these devices as a slave, a 40-conductor cable will be detected as an 80-conductor cable. When a cable is incorrectly detected in this manner, the data transfer rate can be incorrectly set to a speed that cannot be supported by the cable, thereby causing data transfer errors. Another drawback of the ATA/ATAPI detection methodology is the requirement of an additional pin on the host ASIC for each supported port. Since host ASICs generally do not have a pin designated for PDIAG- for each supported port, this detection method reduces the number of available pins that an ASIC designer could otherwise have used for other applications.

Thus, there exists a need for a cable detection method that eliminates the possibility of mistakenly detecting a standard cable for an 80-conductor cable, requires no change to the cable or the ATA/ATAPI device hardware.

SUMMARY OF THE INVENTION

The method of the present invention satisfies these needs.

The present invention is directed to a method of correctly detecting the existence of an 80 conductor cable in a computer system that includes a host device connected to at least one and preferably two ATA/ATAPI peripheral devices.

In the preferred detection method, the host device uses a capacitor to ground on PDIAG-. The cable detect is initiated by an event which causes handshaking between the devices, (e.g. power-on, hard reset, etc). Once the devices are ready, the host BIOS sends an ID command to the first device. If the first device supports mode 3 or 4, then it asserts a PDIAG- signal for a predetermined length of time. The device then releases PDIAG- and measures the state of the PDIAG- signal during a predetermined range of time. The state of PDIAG- is then included in the ID command data sent back to the host. Based on the state of PDIAG-, the host determines the existence of an 80-conductor cable. If the device does not support mode 3 or 4, then the BIOS ignores the cable type bit in the ID command and the device releases PDIAG- by the completion of the command. Every time an ID command is received by a device which supports modes 3 or 4, the device may perform a cable detect before responding to the command. Alternatively the device may simply save the state determined from a previous detection and use that data for subsequent command ID.

In another cable detection method, the host sends an ID command to the first device, then drives the PDIAG- low until an interrupt is returned from the device at command completion. If the device supports mode 3 or 4, then it will release PDIAG- and allow for sufficient time for the pull-up to pull the PDIAG- signal high before sensing the state. If the device does not support mode 3 or 4, then it will not sense the state of the PDIAG- signal but will release PDIAG- by the completion of the command and will not report cable type in the ID data. As the state of the PDIAG- signal is returned to the host, via the ID data for an ID command, a "1" indicates that an 80-conductor cable is present while a "0" would indicate that a standard cable is present.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Figure 1:
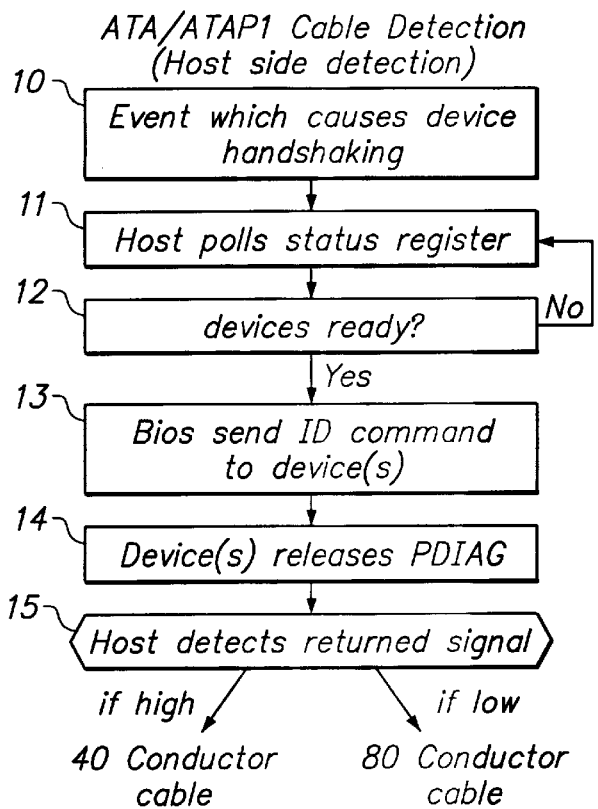
FIG. 1 is a process flow diagram illustrating the ATA/ATAPI host detection algorithm.
Figure 2A:
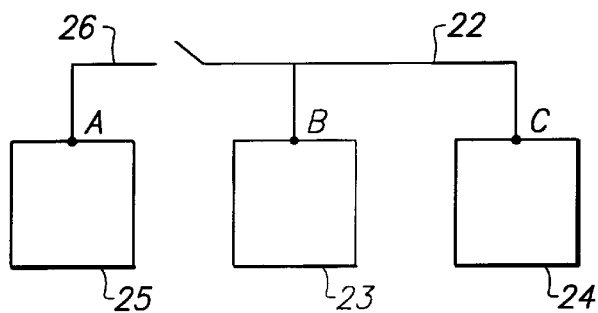
FIG. 2a is a schematic block diagram representations of ATA/ATAPI-4 standards for an 80-conductor cable.
Figure 2B:
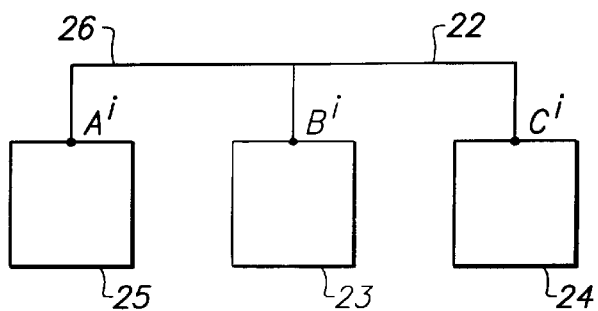
FIG. 2b is a schematic block diagram representations of ATA/ATAPI-4 standards for a 40-conductor cable.

The present invention will now be described in detail with reference to a few preferred embodiments thereof as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

The present invention is constrained by several ATA/ATAPI standards and requirements. Specifically, all ATA/ATAPI devices must be able to assert the PDIAG- signal (drive it low). This is required for the device to function as a device 0 (Slave). All ATA/ATAPI devices must also be able to detect the state of the PDIAG- signal. This is required for the device to function as device 0. The timing for asserting or detecting the PDIAG- signal is on the order of milliseconds to seconds so the timing is very unlikely to be controlled by hardware only but rather controlled through firmware. In order for a cable detection algorithm to work properly, the device firmware must have I/O control of the PDIAG- signal. Additionally, PDIAG- is the only signal that is wired differently on an 80-conductor cable. Also, devices are not required to release PDIAG- after handshaking until the end of the first command, after the devices are ready. Therefore, the most obvious time for a device to perform cable detect would be after receiving an ID command and before responding with RDY and DRQ. Most BIOS sends an ID command as the first command after a power on handshake.

If there is a device 1, then the ID command is sent to this device first. This way device 1 can release PDIAG- and perform cable detect if it supports modes 3 or 4. If the device doesn't support modes 3 and 4, a cable detect would not be performed but the device would at least be required to release the PDIAG- signal before completion of the command. The ID command would then be sent to device 0 and a cable detect would be performed if device 0 supports modes 3 or 4.

In accordance with one embodiment of the present invention, a capacitor to ground is placed at the host on the PDIAG- signal. In the case of the 80-conductor cable, PDIAG- is open at the host so the capacitor would not load the PDIAG- signal. In the case of the standard 40-conductor cable, the host does connect to that signal and PDIAG- would be loaded with the capacitor. A device would assert the PDIAG- signal low for a predetermined time to discharge the capacitor, release the signal and measure it's state within a window of time. A low state would indicate a 40-conductor cable (since the capacitor would be charging through the device pull-ups) while a high state would indicate an 80-conductor cable. This detection is performed after any master/slave handshaking and after a command to cause the slave device to release PDIAG-.

For this embodiment, the capacitors size and signal timing is critical. The capacitor size is determined as follows:

With the capacitor attached, the master/slave handshaking must still function. At the beginning of this handshaking, each device releases PDIAG- within 400 ns and it must be pulled high after 1 ms. This is also true when a single device is attached. In accordance with ATA standards, the pull up is typically 10KΩ but may be 5% higher. The device may have up to 20 pF of load on any signal, the host may have up to 25 pF of load, and the cable may be 40 pF. Currently the pull up voltage is 5V, however in the future the pull up voltage may be 3.3V.

The relationship between the time for the device to reach threshold value and the threshold voltage may be represented by $V=V_{pu}(1-e^{(-t/RC)})$ assuming that the starting voltage is 0

Solving for C: $C=-t/(R(\ln(1-V/V_{pu})))$

Solving for t: $t=-RC(\ln(1-V/V_{pu}))$ where,

V=threshold voltage

Vpu=pull up voltage

C=Capacitive load on signal

R=pull up resistor value t=time to reach threshold

At the start of handshaking, the slowest rise time is generated by the following limits:

V=2.4 (ATA standard)

Vpu=3.0 (Possible future pull-up to 3.3V supply at +/−10%)

R=10500 ohm (ATA standard with 5% resistor)

t=1.0 ms

Given the above values, the maximum value that may be used for C is 0.059 μF. With a higher value, the handshaking may not function properly. Generally, the lower the value, the shorter the time to charge the capacitor through the pull up resistors on the devices. A typical standard value capacitor is 0.047 μF. With a 20% tolerance, the maximum value would be 0.0564 μF, which is within the maximum limit. The additional loading of 20, 25, and 40 pF mentioned above is insignificant given this order magnitude capacitor.

Given the selection of 0.047 μF, the limits of the window where PDIAG- would be high given an 80 conductor cable and low for a 40-conductor cable can be determined. The minimum time of the window is determined by the maximum time it will take for PDIAG- to go high with an 80-conductor cable attached. With an 80-conductor cable, the capacitor would not be loading the PDIAG- signal. The only load would be that of the drive itself (20 pF maximum) and the cable (40 pF maximum). Since the load of the cable is independent of the number of devices attached, the maximum rise time will be for the case with a single drive attached. As with the determination of C, the pull up may be to a 3.3V supply and could be 10KΩ+5%.

Assuming,

R=10500 ohm

Vpu=3.0

V=2.4

C=60 pF the longest time that PDIAG- may take to reach a high value with an 80-conductor cable is 1.01 μs.

The maximum time of the window is determined by the minimum time that it will take for PDIAG- to reach a high state with a 40-conductor cable attached. With a 40-conductor cable, the capacitor at the host is present. Given that each device has a pull up, the shortest time will be with two devices attached. Each device will have a 10K ohm pull up which can be as low as 9500 for a 5% resistor. In addition, some devices have additional pull up current through their I/O. The highest current through the additional pull-up in the I/O may be equivalent to a 27500 ohm resistor. The two external and two internal pull up resistors in parallel are equivalent to a single 3530 ohm resistor. An ATA output driver must be able to drive Vol of 0.5 at Iol, where Vol ("voltage out low") represents the voltage that an output drives the signal to when driving out a 0 value and Iol ("current out low") represents the amount of current a driver supplies when driving out a 0 value. To reach 0.5V with an Iol of 4 mA, the driver must have a resistance to ground of less than 125 ohm. At 125 ohm, a driver would pull down a 3530 ohm load to 188 mV. Assume though that the voltage is only pulled to 0.3V before it is released. So that, R=3530 ohm Vpu=5.5

C=0.0376 μF (lowest value for 20% tolerance capacitor)

With V=0.8: t=20.4 μs

With V=0.3: t=7.4 μs the shortest time that PDIAG- may take to reach a high value with a 40-conductor cable (from 0.2 to 0.8V) is 13 μs.

It is also important to know how long it will take to discharge the capacitor when a device asserts PDIAG-. The maximum time to discharge the capacitor (down to 0.3V) would depend on the maximum resistance to ground. As stated above, the driver itself may have 125 ohm maximum. In combination with the 3530 ohm pull up, the lowest level that the signal could reach is 188 mV. Assuming this were 200 mV, the exponential curve will be to a minimum of 200 mV. This would be equivalent to a curve from 5.3 to 0V.

Taking the same relationship $V=Vpu(e^{(-t/RC)})$

Solving for t: $t=-RC(\ln(V/Vpu))$

V=0.1

Vpu=5.3

R=125

C=0.0564 μF (maximum for 20% tolerance capacitor)

These numbers show that it may take up to 28 us to discharge the capacitor.

Figure 3:
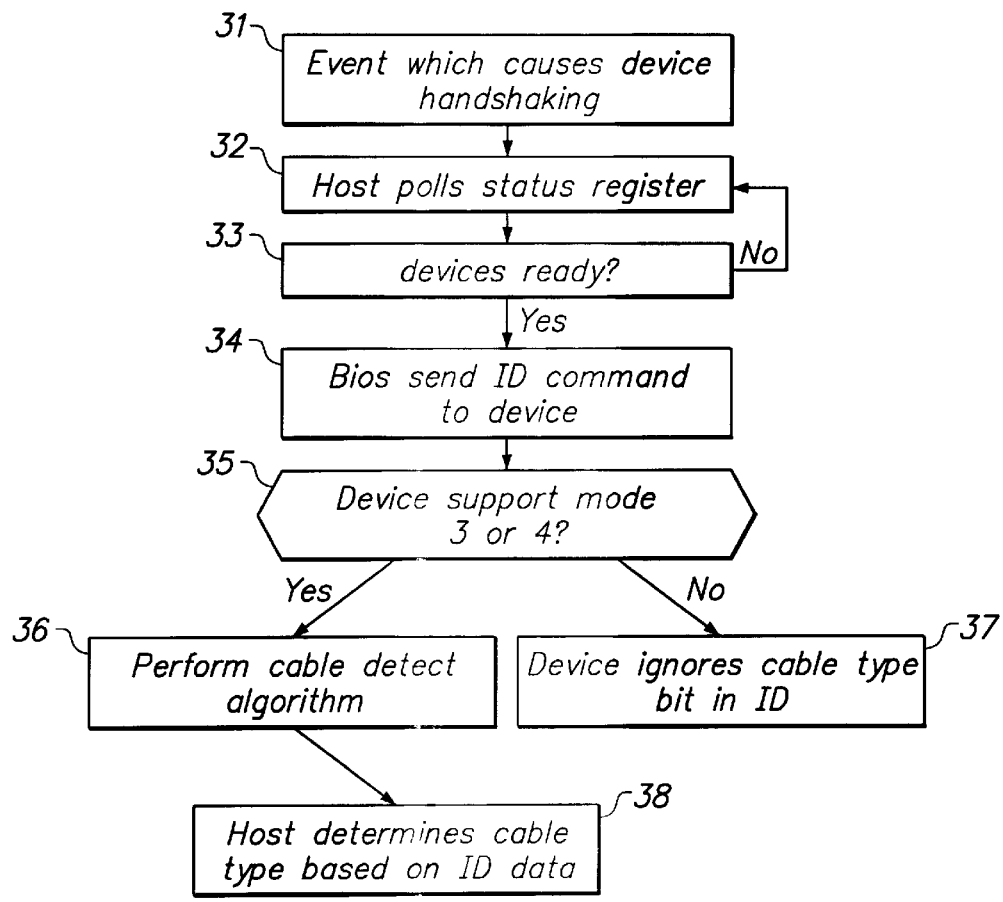
FIG. 3 is a process flow diagram illustrating a cable detection method in accordance with principles of the present invention.

The present invention is represented by the process flow diagram shown in FIG. 3, which is directed to two peripheral devices, such as a disk drive, a tape drive, or an optical, connected to a host. It should be understood that the present invention may also be applicable to a single device connected to the host. As shown, a cable detection sequence is initiated by step 31, an event that causes device "handshaking" e.g. after a power-on or reset. The host then polls the status registers of each device during step 32 to check if the devices are ready. During handshaking from device 1 to device 0, device 1 indicates that device 1 is attached, through DASP- (Device Active, Slave Present), and that device 1 has passed its diagnostics through PDIAG-. Device 0 just watches these two signals (DASP and PDIAG-) for a maximum of approximately 31 seconds to see if device 1 exists. When the devices are ready, host BIOS sends an ID command to device 1, represented by step 34. If the device supports modes 3 and 4, step 35, then the preferred cable detection algorithm is preformed, represented by step 36 and shown in process flow diagram form in FIG. 4. If device 1 does not support modes 3 and 4 then the device ignores the cable type bit in the ID command and releases PDIAG- by the completion of the command, step 37. The host then sends an ID command to device 0, if a second device was connected, and the same routine is performed to determine if cable detect algorithm is initiated.

Figure 4:
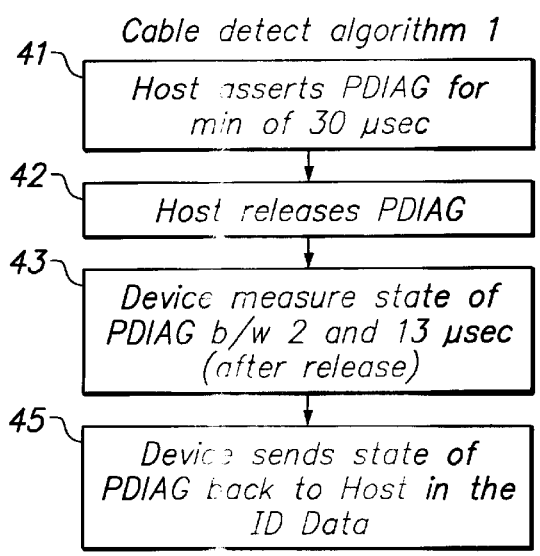
FIG. 4 is a process flow diagram further illustrating cable detection method of FIG. 3.

As illustrated in FIG. 4, and explained above, the preferred cable detection algorithm places a capacitor at the CBLID- signal 26 of the host 25. Host 25 asserts PDIAG- for a minimum of 30 μsec, step 41, to assure that the capacitor is discharged. Then the host 26 releases PDIAG-, step 42. Device 1 then measures the state of PDIAG- during the period of 2 to 13 μsecs after the host has released PDIAG-, step 43. At step 45, device 1 send the state of PDIAG- back to the host, via the ID data, step 45. A state of 1 returned from the device indicates that an 80-conductor cable is present to either the BIOS or the OS driver. A state of 0 returned from the device indicates that a standard cable is present and modes 3 and 4 must not be set.

The preferred embodiment, described above, prevents a non-40 conductor cable from being mistakenly identified as an 80 conductor cable while enabling the host ASIC's not to require the use of a pin designated for PDIAG- of each supported port.

Figure 5:
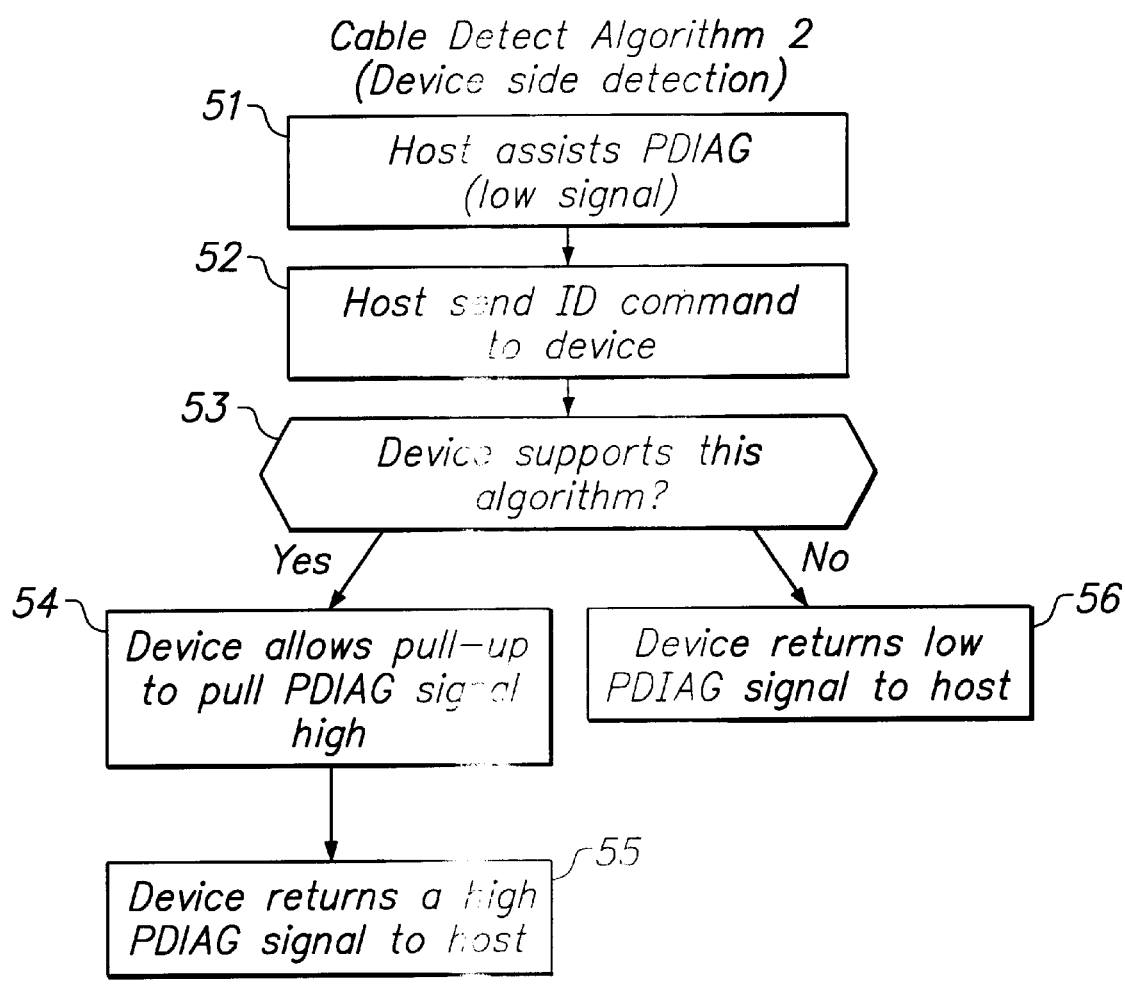
FIG. 5 is a process flow diagram illustrating an alternative cable detection method in accordance with an embodiment of the present invention.

Alternatively, FIG. 5 illustrates the flow diagram for another cable detect algorithm. In this embodiment, a capacitor is not placed at CBLID- of the host. As such the host asserts PDIAG-, step 51, driving the signal low. The host then sends an ID command to device 1. If device 1 supports this algorithm, then device 1 allows the PDIAG- signal to be pulled up to a high signal, step 54. The device then returns the high PDIAG- signal to the host, indicating the presence of an 80-conductor cable, step 55. If the device does not support this algorithm, then the PDIAG- signal is released back to the host as a low signal, indicating that a non-80 conductor cable is present and modes 3 and 4 must not be set.

It should be noted that a device that supports the preferred detection method, i.e. the method represented in FIG. 4, also functions properly and will correctly identify the cable type in the ID data when the device is connected to a host that supports the detection method represented in FIG. 5.

Therefore, the present examples are to be considered as illustrative and not restrictive, and the invention is not to be limited to the details given herein, but may be modified within the scope of the appended claims.

What is claimed is:

1. In a computer system including a host connected to at least one peripheral device by a cable, the cable for transferring data between the host and the at least one peripheral device at a data rate depending on a cable type, a method for detecting the cable type comprising the steps of:
   the host polling a status register of the at least one peripheral device;
   the host sending an ID command to the at least one peripheral device;
   the at least on peripheral device asserting a PDIAG- signal for a predetermined time;
   the at least one peripheral device releasing the PDIAG- signal;
   the at least one peripheral device measuring a state of the PDIAG- signal during a window of time;
   responsive to the ID command, the at least one peripheral device sending the state of the PDIAG- signal to the host; and
   the host determining the cable type by the measured state of the PDIAG- signal as sent from the device.

2. The method of claim 1 wherein a high state of the PDIAG- signal indicates the existence of an 80-conductor cable.

3. The method of claim 1 wherein a low state of the PDIAG- signal indicates the existence of a non-80 conductor cable.

4. The method of claim 1 wherein the predetermined time is at least approximately 30 microseconds.

5. The method of claim 1 wherein the step of measuring the state occurs after the at least one peripheral device has asserted the PDIAG- signal for the predetermined time.

6. The method of claim 1 wherein the window of time is approximately 2 to 13 microseconds.

7. The method of claim 1 further comprising the step of placing a capacitor at the host device, on the PDIAG- signal.

8. The method of claim 7, wherein the capacitor has a capacitance of approximately 0.047 microfarads.

9. The method of claim 1 wherein the at least one peripheral device comprises a master or a slave device.

10. The method of claim 1 wherein the step of measuring the state of the PDIAG- signal is bypassed if the at least one peripheral device does not support modes higher than Ultra DMA 2.

11. The method of claim 10 further comprising the step of the at least one peripheral device releasing the PDIAG- signal.

12. In a computer system including a host connected to at least one peripheral device by a cable, each cable for transferring data between the host and the peripheral device at a data rate depending on a cable type, a method for detecting the cable type comprising the steps of:
    the host sending an ID command to the at least one peripheral device;
    the host driving a PDIAG- signal to a state for a predetermined time;
    the at least one peripheral device releasing the PDIAG- signal;
    the at least one peripheral device determining the state of the PDIAG- signal during a window of time;
    the at least one peripheral device sending ID data to the host, the ID data including the state of the PDIAG- signal; and
    the host determining the cable type from the state of the PDIAG- signal received from the at least one peripheral device.

13. The method of claim 12, wherein a high state of the PDIAG- signal reported in the ID data indicates the existence of an 80-conductor cable.

14. The method of claim 12, wherein a low state of the PDIAG- signal reported in the ID data indicates the existence of a non-80-conductor cable.

15. The method of claim 12 wherein the step of the at least one peripheral device determining the state of the PDIAG- signal is bypassed if the at least one peripheral device does not support modes higher than Ultra DMA 2.

16. The method of claim 15 further comprising the step of the at least one peripheral device releasing the PDIAG- signal.

* * * * *

UNITED STATES PATENT AND TRADEMARK OFFICE
CERTIFICATE OF CORRECTION

PATENT NO. : 6,223,229 B1
DATED : April 24, 2001
INVENTOR(S) : Kvamme

It is certified that error appears in the above-identified patent and that said Letters Patent is hereby corrected as shown below:

<u>Column 7,</u>
Line 23, replace "on" with -- one --.

Signed and Sealed this

Thirtieth Day of April, 2002

Attest:

Attesting Officer

JAMES E. ROGAN
*Director of the United States Patent and Trademark Office*